United States Patent [19]

Bastgen

[11] 3,979,296

[45] *Sept. 7, 1976

[54] FILTER

[75] Inventor: Wendell Bastgen, Betzdorf, Germany

[73] Assignee: Albert Klein KG, Nieder-Fishbach, Germany

[ * ] Notice: The portion of the term of this patent subsequent to Apr. 2, 1991, has been disclaimed.

[22] Filed: Apr. 21, 1975

[21] Appl. No.: 569,803

Related U.S. Application Data

[60] Continuation of Ser. No. 449,611, March 11, 1974, abandoned, which is a division of Ser. No. 253,178, May 15, 1972, Pat. No. 3,800,952.

[30] Foreign Application Priority Data

June 5, 1971   Germany............................ 2127974

[52] U.S. Cl................................. 210/324; 100/118; 210/386; 210/400
[51] Int. Cl.$^2$...................... B01D 33/04; B30B 9/24
[58] Field of Search.................... 210/324, 386, 400; 100/118

[56]  References Cited

UNITED STATES PATENTS

| 1,567,489 | 12/1925 | Burt | 100/118 |
|---|---|---|---|
| 1,911,434 | 5/1933 | Clemens | 162/314 |
| 2,881,072 | 4/1959 | Clark | 162/132 |
| 3,138,088 | 6/1964 | Loth | 210/386 |
| 3,601,039 | 8/1971 | Schover | 100/118 |
| 3,605,607 | 9/1971 | Gujev | 100/118 |
| 3,613,564 | 10/1971 | Adamski et al. | 100/118 |
| 3,800,952 | 4/1974 | Bastgen | 210/324 |

Primary Examiner—Theodore A. Granger
Attorney, Agent, or Firm—Norman S. Blodgett; Gerry A. Blodgett

[57]  ABSTRACT

A filter consisting of two endless belts of filter material having runs pressed together, of means pressing a run of one belt against the adjacent run of the other, and of a feed device for introducing the slurry between the runs.

27 Claims, 2 Drawing Figures

FILTER

This is a continuation, of application Ser. No. 449,611 filed Mar. 11, 1974, now abandoned, which is a division of application Ser. No. 253,178 filed May 15, 1972, now U.S. Pat. No. 3,800,952.

BACKGROUND OF THE INVENTION

The filter of the invention is used for the removal of liquid from suspensions, sludges, and the like, particularly sludges derived from thinner suspensions by thickening. Belt filters for this purpose have been described in German Patent Specification No. 1,277,203 which shows a feed device for the sludge and a power-driven, traveling, endless-screening belt guided over rollers and made of wire mesh or plastic mesh. The lower run of a pressure belt, also guided on rollers and situated above the screening belt, runs in the opposite direction to the substantially horizontal upper run of the latter; the pressure belt extends over part of the length of the upper run of the screening belt, is pressed against the latter as it travels, the pressure forces increasing along the path of contact. Belt filters of this kind can be operated continuously and, if necessary, without supervision; both the capacity and the degree of dryness obtained in the press cake satisfy many requirements.

Another filtering system is described in Bulletin 700 of the firm of Smith & Loveless, U.S.A., in which sludge taken from an inspissator is passed on to a first traveling screening belt the end of which ejects partly-drained product to a second screening belt following it. As the second screening belt effectively forms a prolongation of the first, this system neither saves over-all length nor gives any special advantage unless it is that of subdividing an already known belt into two separate belts. A leaflet entitled "GUVA" published by the GUVA AG Verfahrenstechnik und Apparatebau, of Rumlang, Switzerland, describes a filter tower in which use is made of two generally vertical moving filter cloths which define between them a gap which narrows toward the bottom. Some materials to be filtered subject the filter cloths to the danger of becoming seriously clogged; when sludge is used which in the initial state is a thin liquid, this causes a comparatively high pressure in the vertical gap which prevents effective preliminary drainage and results in a turbid filtrate. The moisture to be extracted can emerge on both sides of the filter cloth, and the apparatus can be erected on a very small area. The height and space required, however, are considerable, and the constructional expense is on a level with that involved in the previously-described type of belt filter.

The German Pat. No. 881,969 suggests, for the withdrawal of liquid such as the juice from a pulp of fruit or the like, a number of systems equipped with traveling sponge belts, which by their own suctional effect serve to extract the moisture or juice from the material fed to the apparatus, the liquid being later pressed from the belt. In order that adequate lengths of these sponge belts can be accommodated, systems are also described in which a number of these traveling absorbent endless belts are mounted one above the other. A knowledge of these multiple traveling absorbent layers (mainly used for the removal of juice or water from fruit pulp or foodstuffs) has nevertheless not proved an inducement to the technician concerned with the drainage of clarification sludge, in the period of time that has passed since the publication of the aforementioned patent, to apply the same technique to this other sphere, which has different conditions.

It is, therefore, an outstanding object of the present invention to provide a belt filter which will occupy little space and yet provide ample active filter surface, so that high filter performance will be obtainable with only moderate space requirements and expenditure.

SUMMARY OF THE INVENTION

In general, the invention comprises a belt filter in which a pressure belt and a screening belt are made from a petal or plastic mesh, and a feed device is mounted above the upper run of the pressure belt.

More specifically, according to the present invention a belt filter for removing liquid from suspensions, sludges, and the like, comprises an endless, roller guided screening belt, having an upper run and a lower return run, an endless roller guided pressure belt which is mounted above the screening belt, and which has an upper run and a substantially horizontal lower run. Means is provided for pressing at least a part of the length of the lower run of the pressure belt against at least a part of the length of the upper run of the screening belt, the pressure forces increasing along the contiguous parts of the belts, each of which is formed at least in part of metal or plastic filter fabric. A feed device is situated above the upper run of the pressure belt and is arranged to transfer material to be deliquefied to the pressure belt, the material from the feed device being subsequently fed to the nip between the lower run of the pressure belt and the upper run of the screening belt.

It has been found preferable for the feed device to be mounted above the upstream end of the upper run of the pressure belt, i.e. the end which is the initial end as viewed in its direction of motion. The feed device may be formed as a feed tube whose lower end is situated above a feed apron located directly above the pressure belt. It is of advantage for the pressure belt to be made long enough to ensure that the end of its lower run will project, in the direction of motion, beyond the end of the upper run of the screening belt.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
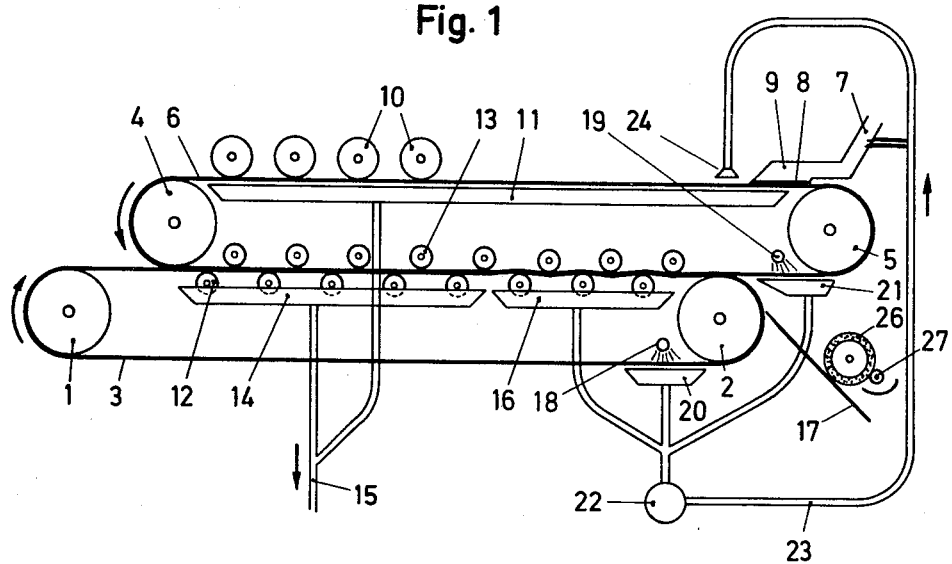
FIG. 1 is a vertical sectional view of a belt filter embodying the principles of the invention.

In FIG. 1, power-driven reversing rollers 1 and 2 are mounted in a fixed frame (not shown). An endless first or screening belt 3 formed of wire mesh is stretched round the rollers 1, 2 in such a way that, when one or other of the reversing rollers 1 and 2 is driven, the belt travels in a taut condition and without sagging. A second frame, also omitted for the sake of simplicity, is mounted, preferably by a spring mounting, so that it can be adjusted with respect to the first frame and carries reversing rollers 4 and 5 around which passes an endless second or pressure belt 6, which is similarly made of wire mesh. The belts 3 and 6 have in the preferred embodiment the same mesh number; however, they may differ in this respect, the pressure belt 6 having, for instance, a higher mesh number than the screening belt 3. The reversing rollers 1, 4 and 2, 5 are not situated immediately one above the other but are staggered with respect to one another in the longitudinal direction of the belts, so that the pressure belt 6 extends to the right beyond the screening belt 3, as seen in FIG. 1. The screening belt 3 projects beyond the pressure belt 6 at the left hand end. Suspensions, sludge or the like, to be drained, are conveyed to the upper strand of the pressure belt 6 via a feed pipe 7 and a feed apron 8 having side plates 9. The system is so constructed that the sludge fed to the apparatus spreads out on the feed apron 8 and slowly moves over the edge of the latter onto the pressure belt 6 at a speed equivalent to about half the linear speed of that belt. This ensures that the sludge is deposited on the pressure belt without causing damage and without the exertion of extraneous forces. Any flakes formed by the action of a flocculation agent are preserved and fine particles contained in the sludge or suspensions are deposited on the pressure belt without being washed through the holes by those extraneous forces. In a feed system of this kind the sludge is only subjected to the effect of gravity and of the water flowing out of the sludge, and all other forces (such as result from tangential movements or the like) are avoided.

The sludge fed to the apparatus in this non-destructive manner moves to the left on the upper run of the pressure belt when the latter is driven and, in a pre-drainage zone following the feed apron 8 where the sludge is again kept free of extraneous forces, a non-destructive drainage action is obtained in which the sludge is further thickened and thus rendered mechanically more stable.

Towards the end of the upper run of the pressure belt 6, a number of pressure rollers 10 in a preliminary pressure zone exert, perpendicular to the surfaces of the said pressure belt 6, forces increasing from one pressure roller to the next and intensifying the drainage effect. During the passage through the pre-drainage zone, the sludge to be drained acquires a consistency which enables the pressure rollers 10 to be used and enables the perpendicular forces to be increased from one roller to the next according to the increasing degree of drainage obtained, leading consequently to the consolidation of the sludge. An interception trough 11, which catches and removes the water discharged through the mesh of the belt 6, is provided below the pre-drainage zone and the pre-pressing zone.

At the end of the upper run the pressure belt 6, on rotation of the reversing roller 4, ejects the pre-drained sludge on to the projecting free end of the screening belt 3, which introduces it into the gap formed between the upper run of the screening belt 3 and the lower run of the pressure belt 6. Between the pressure belt and the screening belt comparatively intensive perpendicular forces are generated which increase along the path of contact in the direction of motion of the belts. To enable these forces to be asborbed, the screening belt 3 and the pressure belt 6 are supported by supporting rollers 12, 13 respectively. The supporting rollers 12 and 13 are situated at equal pitch along the direction of motion of the belt but staggered in respect of one another by half the pitch. Within a first zone (the pressure zone), they are so situated with respect to one another that, although increasing forces are exerted on the sludge present between the pressure belt and the screening belt, both the pressure belt and the screening belt run in a generally straight stretched condition. An interception trough 14 is mounted beneath the pressure zone to receive the discharge of the clarified filtrate. The pressure zone above the interception trough 14 is followed by a shearing zone which is situated above a separate interception trough 16. Within this zone the supporting rollers 12 and 13 come increasingly close together, so that the supporting planes described by their supporting generatrics pass through one another and the runs of the screening belt and pressure belt passing between them travel in a zigzag course. The layer of sludge present between the screening belt and the pressure belt is bent and pressed several times, so that, as a result of the resulting shearing forces, matrices of larger or smaller particles built up within the already largely-drained sludge are caused to collapse, and the liquid in the cavities within is pressed out. Since in this process there is a strong tendency for smaller particules to be carried along with the filtrate, it is found advisable for the filtrate from the shearing zone to be purified again instead of being discharged together with the clarified filtrate from the troughs 11, 14.

At the end of the upper strand of the screening belt 3, i.e. in the area of the roller 2, there is a chute 17, by which drained and pressed cake, produced at the end of the contact path between the screening belt 3 and the pressure belt 6, is removed. At the end of the lower strand of the pressure belt 6 and at the beginning of the lower strand of the screening belt 3, discharge devices 18 and 19 respectively direct cleaning water onto the belts in order to clean them. The cleaning water flowing off and through the belts is intercepted in troughs 20 and 21 and conveyed together with the filtrate of the interception trough 16 to a pump 22 by which the water still containing solids is conveyed to a feed device 24 located above the pre-drainage zone. The water fed in at this point is added to the sludge whose drainage has already commenced; the lower zones of sludge are already poorer in water and thus consolidated. This layer constitutes an additional filter layer for the contaminated water fed to it from the feed device 24. The pipe 23 from the pump 22 may also be directed to the feed pipe 7, so that the water which contains suspended substances, i.e. the washing water and the shearing filtrate from trough 16, is delivered with the flocculated sludge, the suspension, or the like.

Figure 2:
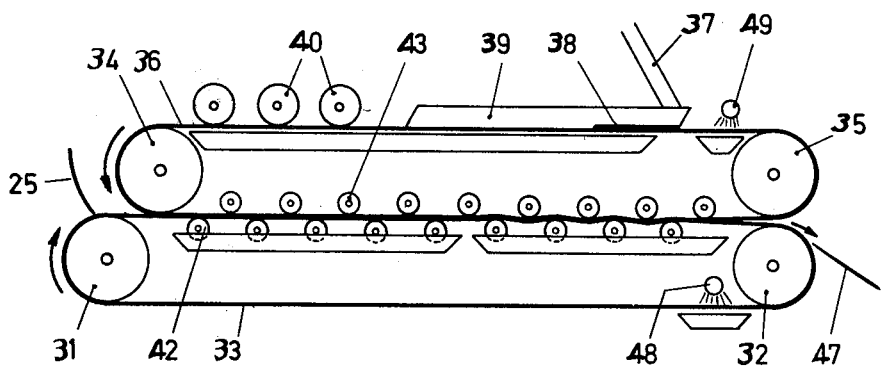
FIG. 2 is a vertical sectional view of a second form of belt filter.

An alternative arrangement is shown in FIG. 2. In order to simplify the diagram and avoid repetitions, parts similar to those already known from FIG. 1 have been given similar reference numbers. The construction of FIG. 2 is somewhat more compact than that of FIG. 1, since the screening belt 33 and the pressure belt 36 are more closely aligned lengthwise than was the case in FIG. 1. Nevertheless, in order to ensure that the sludge pre-drained on the upper run of the pressure belt is conveyed to the zones formed between the belts, i.e. the pressure zone and the shearing zone, a baffle 45 is provided behind the reversing roller 34 and assists, by its shape, in the restratification of the pre-drained cake. To obtain a further shortening of the construction, the discharge device 49 is provided above the upper run of the pressure belt. In FIG. 2 the feed pipe 37 leads obliquely to the feed apron 38, in such a way that the horizontal component in the feed of the sludge takes the opposite direction to the movement of the upper run. Particularly in the case of intensively-flowing sludge with a high water content it has been found satisfactory to prolong the side plates 39 of the feed apron 36 beyond the latter and to have them extend, for example, over practically the whole of the pre-drainage zone. In a similar fashion side plates may be provided along the contact path of the belts.

The constructions described provide a number of far-reaching advantages. By the utilization of the pressure belt for drainage purposes the path length of the sludge in the apparatus is approximately doubled. Since parts of the path must be used for washing devices, feed aprons and the like, and cannot be used for drainage, the relative increase in the actual length used for drainage is still greater. Moreover, since along the path of contact of the belts, liquid not only penetrates the screening belt downwardly but can also be discharged upwardly through the pressure belt, the actual surface participating in the drainage is more than trebled in comparison with known machines of similar type and of the same size.

According to the design and operation of the machine, therefore, either many times the previous capacity can be obtained, or the residual moisture can be correspondingly reduced. In practice, the speed, contact pressures, and mesh widths are selected to ensure a considerable increase in capacity combined with a more thorough removal of water, providing a drier cake than with machines of the usual type.

The improved effect, however, is not solely due to the increase in the surface area utilized for drainage. Owing to the re-stratification of the pre-drained sludge in its transfer from the pressure belt to the screening belt, the upper layer (where the drainage is less satisfactory owing to it distance from the mesh of the pressure belt) is now located on the lower side and is thus in direct contact with the screening belt, so that its higher water content is rapidly reduced. At the same time, with the re-stratification brought about by the transfer from the pressure belt to the screening belt which is driven in the opposite direction, the structure of the cake formed in the pre-draining of the sludge is altered in such a way that the discharge of water is further and considerably increased. These effects, which greatly assist the removal of water, are obtained neither in the known method of transfer to a second belt running in the same direction, nor in the method in which filtered product is ejected onto another belt inclined to the original belt at an angle; it is only when it is ejected from the upper belt to a strand of belting moving below it and in the opposite direction that the effects are obtained in their entirety.

The possibility of discharging water from the cake through the pressure belt, both during its passage through the pressure zone and during its passage through the shearing zone, is of advantage not only because it increases that area of the apparatus which permits passage of drain water; it is now possible for the water within the lower vertical half of the layer to be discharged downwards, while that within the upper half of the layer can be discharged upwards. Thus, the maximum length of path to be traversed by the water within the cake no longer corresponds to the full height of the latter, but only to half the height, and the resistance which resists the outflow of the water is considerably reduced. Thus, the system avoids what occurred in earlier belt filter constructions with a non-permeable pressure belt; the pressed cake discharged at the end of the contact path was drained of water more thoroughly on the lower side than in its upper layers. The use of a perforated or meshed pressure belt with the possibility of discharging water both upwards and downwards results in a product in which the residual moisture is not only less than in systems previously known but which is also far more evenly distributed. Even during the passage along the path of contact this system already provides considerable advantages; hitherto, the pressure had to be increased comparatively slowly, since the zones of the cake facing towards the pressure belt retained moisture longer and thus remained flowable for longer than those zones of the sludge adjacent the screening belt. In the present bilateral drainage method this effect is absent, the removal of water being far more even throughout the thickness of the layer, so that the pressure can also be increased to a greater extent along the pressure zone. This is because no account need be taken of layers still remaining flowable and liable to emerge from the belts at the side.

In practical operation it has been found that 95% of the solids in the waste water emanate from the shearing zone or from the washing devices. In a drainage water guiding system such as shown in FIG. 1, therefore, the clarified filtrate occurring in the pipe 15 can be regarded as perfectly clean, and the solids appearing in the waste water are removed practically in their entirety by the pipe 23 and recycled to the filtering process.

Fundamentally a drainage operation of this kind, as far as the waste water having the main residual solids is concerned, could be also carried out with belt filters of the customary type. It is found, however, that the pre-drainage zone available in such systems is generally far too short, so that the cake which has formed at the end of the pre-drainage zone can only be subjected, in the pressure zone and also in the shearing zone, to limited and gradually increasing forces along the path of contact of the belts. The result is that the ejected pressed cake is not sufficiently drained for most applications, or else impractically limited throughput speeds must be applied. A system of the kind described herein, utilizing the recycling of the shearing filtrate and possibly of the washing water, offers further advantages besides that of an almost completely clean clarified filtrate. Owing to the more intensive wetting of the pressure belt by the liquid from the feed device 24, that belt undergoes far less contamination from solid particles adhering thereto than the lower belt. It is, therefore, possible to dispense with rinsing devices altogether, or to operate these periodically, or to subject them to less force, resulting both in a saving of water and in a smaller quantity of washing water having to recycled. In most operations, owing to the greater extent to which the cake is pressed, a further advantageous effect has become evident; the screening belt 3 undergoes normal contamination, but the solid particles adhering thereto are taken up by new press cakes, under the effect of the increased pressure, and are removed from the screening fabric, so that in operation a stable state is obtained, with relatively little contamination, and a washing device can then be dispensed with. The adoption of high pressures between the belts may prevent water draining freely through the screening fabric as a result of the contamination, but that is no disadvantage since particles of dirt on the belt are taken up by the new cake, and the pre-drained cake fed on to the screening belt no longer has any freely discharging water which would necessitate, for more rapid discharge, a completely clean screening belt with ample through-flow cross sections. Thus, for drainage and in view of the effect of high pressure within the pressing zone and shearing zone, it is immaterial whether the screening belt, which is in any case covered by the cake, was originally contaminated or not. The use of a pressure belt constructed on the lines of a screening belt, i.e. the use of two screening belts, therefore, makes it possible, by contrast with the use of a single screening belt and a water impermeable pressure belt, to limit the consumption of rinsing water considerably, or to dispense with it altogether, so that only the shearing filtrate has to be recycled and the pre-drainage zone is subject to less recycle liquid, despite the repeated processing of solids-containing filtrate.

The residual water retained in the meshes of the pressure belt and participating on the self-cleaning effect of the latter also involves certain disadvantages. After the removal of the pressure belt from the screening cake at the end of the shearing zone, the water may be released from the belt and may wet the surface of the cake. While it is true that this small amount of water in itself plays no appreciable part, it is possible, as shown in FIG. 1, to have a roller 26, covered with a sponge-like absorbent material, run loosely over the pressed cake, so that the water present on the surface of the latter is removed by capillary action. A pressure roll 27, driven by or driving the roller 26, and mounted above a discharge channel, presses water out the absorbent material, so that it is continuously capable of taking up further water.

Further variants are possible. Particularly in the processing of extremely sensitive sludge, for example, it may become necessary for the contact pressures exerted by the pressure rollers 10 to be sensitively adjusted to low values. In this case they can be loaded by adjustable springs or else mounted on rocker arms the torque of which can be adjusted by weights or possibly by counterweights. It is also possible for pressure rolls of the usual kind having a continuous surface, to be replaced by perforating screening rolls which, in turn, can contribute further to the removal of water. The arrangement of the supporting rollers 12 and 13 can also be modified; it is possible, for example, for them to be adjusted independently. While high maximum pressures are obtained in the contact zone (when the rollers 12, 13 are directly opposite each other), they are greatly reduced by the offset positions shown in the example. Intermediate values for the distances, or an offset amounting to half the pitch, also result in intermediate pressure maximums. Furthermore, the apparatus is not confined to the use of a single pressure belt and a single screening belt; the space available can be put to further use and the structure rendered less expensive, in addition to increasing the filter performance, if one or more additional belts are provided above the pressure belt. In this case, two belts can be located at a distance from one another, so that only their upper run acts as a filter; after sufficient consolidation of the filter cake, however, the sludge is subjected to additional pressure between two belts.

In all cases, belt filters of this category will be considerably improved, both with regard to the capacity and with regard to the degree of dryness obtained in the press cake delivered, by the use of pressure belts with meshes made of metal wire or plastic filament, the suspensions to be drained being fed on to the upper run of the pressure belt, so that in practice the expense incurred can be reduced and the performance increased at the same time.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A filter for removing liquid from a slurry, comprising:
   a. a first endless belt of filter fabric mounted on end rollers so as to form a horizontally-elongated loop having an upper run and a lower run,
   b. a second endless belt of filter fabric mounted on end rollers above the first belt so as to form a horizontally-elongated loop having an upper run and a lower run,
   c. means pressing the lower run of the second belt against the upper run of the first belt,
   d. a feed device situated at the upstream end of and above the upper run of the second belt, the material from the feed device eventually entering the nip between the lower run of the second belt and the upper run of the first belt, which runs are driven in the same direction, and
   e. means underlying the upper run of the second endless belt to hold it substantially flat for conveying and preliminary draining of the newly-introduced slurry.

2. A filter as recited in claim 1, wherein the feed device extends over the width of the second belt and transfers material to the second belt at a rate dependent on the speed of the belt, and wherein a pressure roller is provided having a perforated screen cylindrical surface, the roller being positioned at the downstream end of the upper run of the second belt, and pressing against that belt.

3. A filter as recited in claim 1, wherein the feed device comprises a feed apron which is located above the upper run of the second belt and which is fed through a feed pipe.

4. A filter as recited in claim 1, wherein the downstream end of the lower run of the second belt extends beyond the end of the upper run of the first belt.

5. A filter as recited in claim 1, wherein the second belt has a guide roller at the downstream end of its upper run and that guide roller is situated above the upper run of the first belt.

6. A filter as recited in claim 1, wherein the means for pressing together the first and second belts comprise sets of supporting rolls acting on the upper run of the first belt and the lower run of the second belt.

7. A filter as recited in claim 6, wherein in a first section of a path of contact of the belts, the supporting rollers on opposite sides of the belt are situated one above the other while in at least one second section they are staggered with respect to one another in a horizontal direction.

8. A filter as recited in claim 6, wherein the supporting rollers which are associated with the first belt are offset in relation to the supporting rollers associated with the second belt by an amount equal to one-half the distance between successive rollers, while in at least one first section of a path of contact between the belts the second belt and the first belt take a straight course, whereas in at least one further section, owing to the greater penetration of the supporting rollers, they take a zigzag course.

9. A filter as recited in claim 1, wherein a separate collecting trough is situated below the downstream section of a path of contact of the belts, and the discharge from that trough is led via a pump to the upper run of the second belt.

10. A filter as recited in claim 9, wherein the discharge from the pump is led to the feed device for the material to be deliquefied.

11. A filter as recited in claim 9, wherein the discharge from the pump is also led to a second feed device delivering on to the upper run of the second belt.

12. A filter as recited in claim 9, wherein a washing device is provided for delivering washing water to at least one of the belts, and wherein means is provided for collecting the washing water and feeding it to the pump.

13. A filter as recited in claim 1, wherein an absorbent material is pressed against pressed effluent emerging from between the first belt and the second belt.

14. A filter for removing liquid from a slurry, comprising:
   a. a first endless belt of filter fabric mounted on end rollers so as to form a horizontally-elongated loop having an upper run and a lower run,
   b. a second endless belt of filter fabric mounted on end rollers above the first belt so as to form a horizontally-elongated loop having an upper run and a lower run,
   c. means pressing the lower run of the second belt against the upper run of the first belt,
   d. a feed device situated at the upstream end of and above the upper run of the second belt, the material from the feed device eventually entering between the lower run of the second belt and the upper run of the first belt, which runs are driven in the same direction, and
   e. means associated with the upper run of the second endless belt to hold it substantially flat for conveying and preliminary draining of the newly-introduced slurry, wherein a separate collecting trough is situated below the downstream suction of a path of contact of the belts, and the discharge from that trough is led via a pump to the upper run of the second belt.

15. A filter for removing liquid from a slurry, comprising:
   a. a first endless belt of the filter fabric forming a loop having a upper run and lower run,
   b. a second belt of filter fabric located above the first belt and forming a loop having an upper run and a lower run,
   c. means pressing the second belt against the first belt to form a pressure zone in which the belts are driven in the same direction,
   d. a feed device situated at the upstream end of and above the upper run of the second belt, the material from the feed device eventually entering a nip between the first and second belts, and passing through the pressure zone, and
   e. means underlying the upper run of the second endless belt to hold it substantially flat for conveying and preliminary draining of the newly-introduced slurry, the material being completely enclosed and carried by the belts all the way from the nip to the said pressure zone.

16. A filter as recited in claim 15, wherein the feed device extends over the width of the second belt and transfers material to the second belt at a rate dependent on the speed of the belt, and wherein a pressure roller is provided having a perforated screen cylindrical surface, the roller being positioned at the downstream end of the upper run of the second belt, and pressing against that belt.

17. A filter as recited in claim 15, wherein the feed device comprises a feed apron which is located above the upper run of the second belt and which is fed through a feed pipe.

18. A filter as recited in claim 15, wherein the downstream end of the lower run of the second belt extends beyond the end of the upper run of the first belt.

19. A filter as recited in claim 15, wherein the second belt has a guide roller at the downstream end of its upper run and that guide roller is situated above the upper run of the first belt.

20. A filter as recited in claim 15, wherein the means for pressing together the first and second belts comprise sets of supporting rolls acting on the upper run of the first belt and the lower run of the second belt.

21. A filter as recited in claim 20, wherein in a first section of a path of contact of the belts, the supporting rollers on opposite sides of the belt are situated one above the other while in at least one second section they are staggered with respect to one another in a horizontal direction.

22. A filter as recited in claim 20, wherein the supporting rollers which are associated with the first belt are offset in relation to the supporting rollers associated with the second belt by an amount equal to one-half the distance between successive rollers, while in at least one first section of a path of contact between the belts the second belt and the first belt take a straight course, whereas in at least one further section, owing to the greater penetration of the supporting roller, they take a zigzag course.

23. A filter as recited in claim 15, wherein a separate collecting trough is situated below the downstream section of a path of contact of the belts, and the discharge from that trough is led via a pump to the upper run of the second belt.

24. A filter as recited in claim 23, wherein the discharge from the pump is led to the feed device for the material to be deliquefied.

25. A filter as recited in claim 23, wherein the discharge from the pump is also led to a second feed device delivering onto the upper run of the second belt.

26. A filter as recited in claim 23, wherein a washing device is provided for delivering washing water to at least one of the belts, and wherein means is provided for collecting the washing water and feeding it to the pump.

27. A filter as recited in claim 15, wherein an absorbent material is pressed against pressed effluent emerging from between the first belt and the second belt.

* * * * *